(12) United States Patent
Tonaka et al.

(10) Patent No.: US 10,287,907 B2
(45) Date of Patent: May 14, 2019

(54) LINEAR MOTION MECHANISM, GOVERNING VALVE DRIVE DEVICE, AND STEAM TURBINE

(71) Applicant: MITSUBISHI HEAVY INDUSTRIES COMPRESSOR CORPORATION, Tokyo (JP)

(72) Inventors: Hideki Tonaka, Tokyo (JP); Naoyuki Nagai, Tokyo (JP); Naruhito Harada, Tokyo (JP); Makoto Katagake, Hiroshima (JP); Tomoaki Okamura, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 372 days.

(21) Appl. No.: 15/039,742

(22) PCT Filed: Dec. 17, 2014

(86) PCT No.: PCT/JP2014/083409
§ 371 (c)(1),
(2) Date: May 26, 2016

(87) PCT Pub. No.: WO2015/093528
PCT Pub. Date: Jun. 25, 2015

(65) Prior Publication Data
US 2017/0002680 A1    Jan. 5, 2017

(30) Foreign Application Priority Data

Dec. 18, 2013 (JP) .................................. 2013-261808

(51) Int. Cl.
*F01D 17/14* (2006.01)
*F16H 57/04* (2010.01)
(Continued)

(52) U.S. Cl.
CPC ............. *F01D 17/145* (2013.01); *F01D 5/02* (2013.01); *F01D 5/12* (2013.01); *F01D 25/24* (2013.01);
(Continued)

(58) Field of Classification Search
None
See application file for complete search history.

(56) References Cited

U.S. PATENT DOCUMENTS

| | | | | |
|---|---|---|---|---|
| 5,832,944 A | * | 11/1998 | Lindner | ................ F01D 17/145 137/1 |
| 6,756,707 B2 | * | 6/2004 | Hochhalter | ............. F16H 25/20 310/20 |
| RE38,562 E | * | 8/2004 | Babiel | ..................... F16N 13/02 100/289 |

FOREIGN PATENT DOCUMENTS

| | | |
|---|---|---|
| DE | 10 2010 045 069 A1 | 3/2012 |
| DE | 102010045069 A1 * | 3/2012 ......... F16H 25/2214 |

(Continued)

OTHER PUBLICATIONS

Extended European Search Report dated Jan. 25, 2017 in Counterpart Application No. EP 14873062.5.
(Continued)

*Primary Examiner* — Justin D Seabe
*Assistant Examiner* — Juan G Flores
(74) *Attorney, Agent, or Firm* — Birch, Stewart, Kolasch & Birch LLP

(57) ABSTRACT

A linear motion mechanism (27) is provided with: a cylinder rod (312) into which a ball screw (30) can be inserted, said cylinder rod (312) including a base end section that is connected to a nut (311) within a piston casing (36) and a tip section (312a) that is exposed on the outside of the piston casing (36); a nut-side grease supply hole (321) that is formed in the nut (311) and that includes a discharge port (323) that opens toward the outer circumferential surface of
(Continued)

the ball screw (30); and a cylinder rod-side grease supply hole (322) that is formed in the cylinder rod (312), that includes on one end thereof an inlet (324) that opens at a position that is exposed to the outer section of the piston casing (36), and that includes another end (322b) that is connected to the nut-side grease supply hole (321).

7 Claims, 8 Drawing Sheets

(51) Int. Cl.
    *F01D 5/02*     (2006.01)
    *F01D 5/12*     (2006.01)
    *F01D 25/24*     (2006.01)
    *F16K 31/04*     (2006.01)
    *F16H 25/22*     (2006.01)

(52) U.S. Cl.
    CPC ....... *F16H 57/0497* (2013.01); *F16K 31/047* (2013.01); *F05D 2220/31* (2013.01); *F05D 2260/57* (2013.01); *F05D 2270/58* (2013.01); *F05D 2270/62* (2013.01); *F16H 25/2204* (2013.01)

(56) References Cited

FOREIGN PATENT DOCUMENTS

| JP | 2000-161461 A | 6/2000 |
|----|---------------|--------|
| JP | 2002-122204 A | 4/2002 |
| JP | 2002-130420 A | 5/2002 |
| JP | 2004-80857 A | 3/2004 |
| JP | 4005444 B2 | 11/2007 |
| JP | 4784748 B2 | 10/2011 |
| JP | 2013-72349 A | 4/2013 |

OTHER PUBLICATIONS

International Search Report and Written Opinion of the International Searching Authority (Forms PCT/ISA/237 and PCT/ISA/210), dated Feb. 3, 2015, for International Application No. PCT/JP2014/083409, with an English translation.

\* cited by examiner

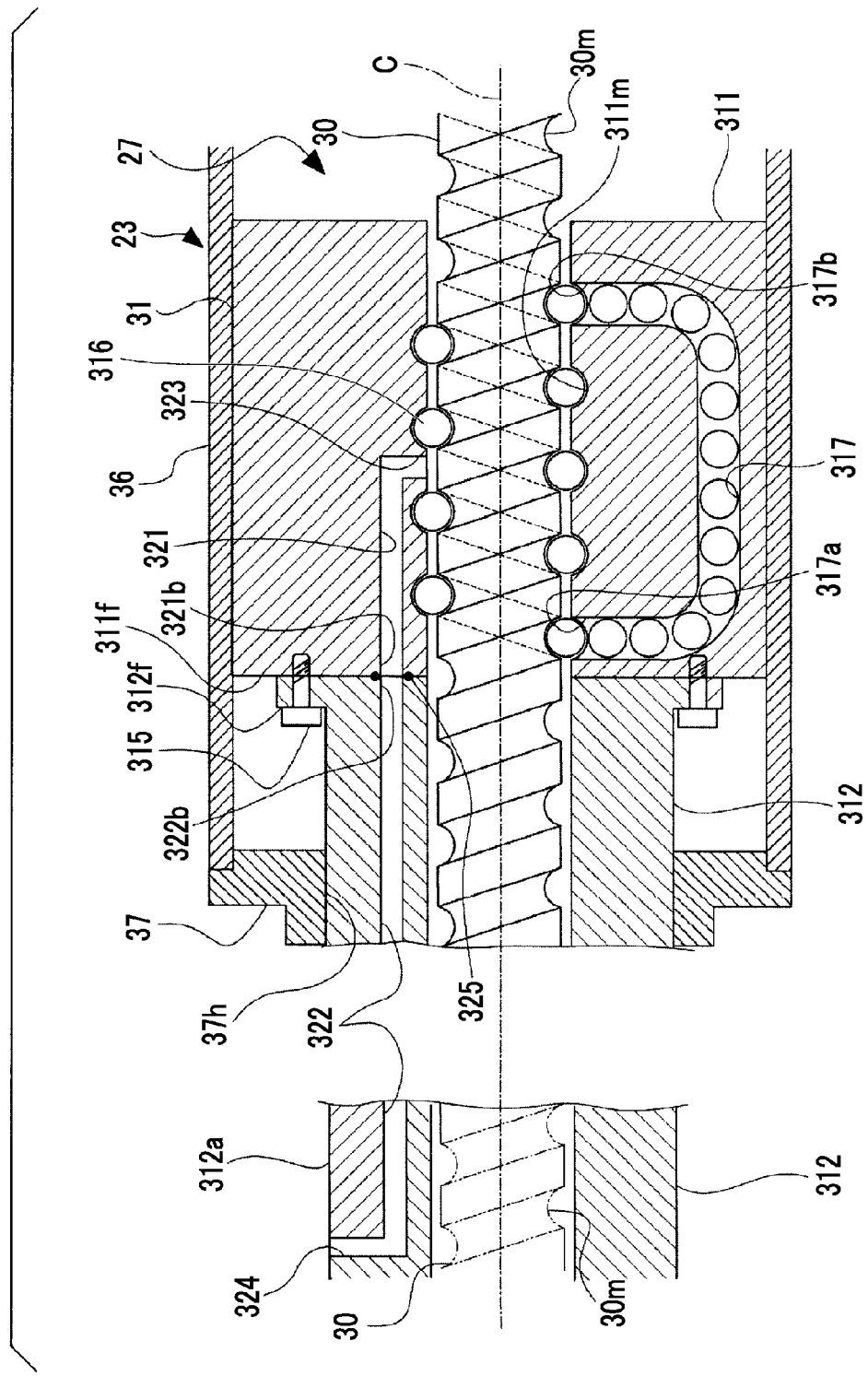

US 10,287,907 B2

LINEAR MOTION MECHANISM, GOVERNING VALVE DRIVE DEVICE, AND STEAM TURBINE

TECHNICAL FIELD

The present invention relates to a linear motion mechanism, and a governing valve drive device and a steam turbine which use the linear motion mechanism.

Priority is claimed on Japanese Patent Application No. 2013-261808, filed Dec. 18, 2013, the content of which is incorporated herein by reference.

BACKGROUND ART

A steam turbine is used so as to drive a machine or the like, and includes a turbine main body having a rotor which is rotatably supported. The rotor is rotationally driven by supplying steam serving as a working fluid to the turbine main body. Steam supplied to the turbine main body or steam extracted from the turbine main body flows through a steam channel of the steam turbine. A governing valve is provided in the steam channel. By adjusting an opening degree of the governing valve, it is possible to adjust a flow rate of the steam supplied to the turbine main body.

The governing valve is driven by an governing valve drive device. For example, PTL 1 discloses a governing valve drive device which includes an electric motor, and a switching mechanism such as a ball screw or the like which converts a rotary motion of the electric motor into a linear motion of a governing valve.

Since the ball screw includes a meshing portion having a contact angle in a spiral screw groove, if opening and closing operations of the governing valve are repeated for a long period, there is a problem that only a specific portion of the meshing portion of the ball screw is abraded.

PTL 2 discloses a configuration in which grease is supplied to a ball screw nut, into which a ball screw shaft having screw grooves formed on the outer circumference surface is screwed, from the outside.

PTL 3 disclose a configuration in which a ball screw is accommodated in a tubular housing and a grease supply pipeline for supplying grease to a ball screw nut screwed into a ball screw shaft from the outside is provided. In this configuration, the grease supply pipeline is provided inside a stator of an electric motor for rotationally driving the ball screw and integrally rotates with a rotor.

CITATION LIST

Patent Literature

[PTL 1] Japanese Unexamined Patent Application Publication No. 2013-72349
[PTL 2] Japanese Patent No. 4784748
[PTL 3] Japanese Patent No. 4005444

SUMMARY OF INVENTION

Technical Problem

In the configuration disclosed in the above-described PTL 2, it is necessary to supply grease to the ball screw nut. However, as the configuration disclosed in PTL 3, in a case where the ball screw is accommodated in the housing, in the configuration disclosed in PTL 2, much time is required so as to access the ball screw nut.

Meanwhile, in the configuration disclosed in PTL 3, since grease is supplied via the grease supply pipeline from the outside of the housing, much time is not required. However, in the configuration disclosed in PTL 3, the grease supply pipeline, a rotary joint for integrally rotating the grease supply pipeline with the rotor, or the like is required. Accordingly, the device is complicated, cost increases, and failure in a grease supply system or the like is likely to occur.

Moreover, in the configuration disclosed in PTL 3, although the grease supply pipeline rotates along with the rotor, the position of the grease supply pipeline in an axial direction of the ball screw is fixed along with the rotor or the housing. That is, in the configuration disclosed in PTL 3, a driving type is effective in which the ball screw nut is fixed and the ball screw shaft advances toward and retreat from the ball screw nut. However, the configuration disclosed in PTL 3 cannot be applied to the drive type in which the ball screw shaft is fixed and the ball screw nut advances and retreats along the ball screw shaft.

The present invention is made in consideration of the above-described circumstances, and an object thereof is to provide a linear motion mechanism, a governing valve drive device, and a steam turbine capable of easily supplying grease and obtaining high reliability regardless of the drive type of the ball screw.

Solution to Problem

The present invention adopts the following means to achieve the above-described object.

(1) According to a first aspect of the present invention, there is provided a linear motion mechanism, including: an electric motor; a ball screw which is rotationally driven around an axis by the electric motor; a nut which is screwed into the ball screw, and advances and retreats relative to the ball screw in an axial direction of the ball screw according to rotation of the ball screw; a casing which surrounds the ball screw and the nut; a tubular cylinder rod which includes a base end section which is connected to the nut inside the casing and a tip section which is exposed to the outside of the casing, and into which the ball screw can be inserted; a nut-side grease supply hole which is formed in the nut and includes a discharge port which opens toward an outer circumferential surface of the ball screw; and a cylinder rod-side grease supply hole which is formed in the cylinder rod, and includes an inlet which opens at a position exposed to the outside of the casing on one end of the cylinder rod-side grease supply hole, and the other end thereof which communicates with the nut-side grease supply hole.

When grease is supplied to the ball screw, if the grease is injected from the inlet in the cylinder rod formed at the position exposed to the outside of the casing to the cylinder rod-side grease supply hole, the injected grease flows from the other end of the cylinder rod-side grease supply hole to the nut-side grease supply hole. The grease flowing to the nut-side grease supply hole is supplied from the discharge port of the nut-side grease supply hole toward the outer circumferential surface of the ball screw. That is, it is possible to supply grease to the linear motion mechanism, in which the ball screw and the nut are accommodated in the casing, from the outside of the casing.

In addition, it is possible to perform the grease supply in either a drive type in which the ball screw advances and retreats with respect to the nut or a drive type in which the nut advances and retreats with respect to the ball screw.

(2) According to the linear motion mechanism according to a second aspect of the present invention, the linear motion mechanism according to (1) further includes a grease supply pipe which is connected to the inlet of the cylinder rod-side grease supply hole and has flexibility, and a grease supply device which supplies a grease from the outside via the grease supply pipe.

According to this configuration, the grease supplied from the outside by the grease supply device can be injected from the inlet of the cylinder rod-side grease supply hole via the grease supply pipe. In addition, since the grease supply pipe has flexibility, even in the drive type in which the nut advances and retreats along the ball screw, it is possible to supply grease in a state where the operation is continued.

(3) According to the linear motion mechanism according to a third aspect of the present invention, the linear motion mechanism according to (1) or (2) further includes a nut-side discharge hole which is formed in the nut, and includes an inflow port, which opens toward the outer circumferential surface of the ball screw at a position different from the position of the opening of the one end of the nut-side grease supply hole, on one end of the nut-side discharge hole, and a cylinder rod-side discharge hole which is formed in the cylinder rod, and includes an outflow port which opens at a position exposed to the outside of the casing on one end of the cylinder rod-side discharge hole and the other end which communicates with the nut-side discharge hole.

According to this configuration, if grease is supplied from the outside via the cylinder rod-side grease supply hole and the nut-side grease supply hole, excessive grease is extruded from a portion between the nut and the ball screw. The extruded grease flows from the inflow port into the nut-side discharge hole. The grease flowing into the nut-side discharge hole can be discharged from the outflow port exposed to the outside of the casing through the cylinder rod-side discharge hole which communicates with the nut-side discharge hole.

(4) According to the linear motion mechanism according to a fourth aspect of the present invention, the linear motion mechanism according to (3) further includes a discharge pipe through which the grease is discharged from the cylinder rod-side discharge hole to the outside and which is connected to the outflow port of the cylinder rod-side discharge hole and has flexibility.

According to this configuration, the grease discharged from the outflow port of the cylinder rod-side discharge hole can be discharged to the outside through the discharge pipe.

Here, since the discharge pipe has flexibility, even in the drive type in which the nut advances and retreats along the ball screw, in a state where the operation is continued, it is possible to discharge excessive grease due to the supply of grease.

(5) According to the linear motion mechanism according to a fifth aspect of the present invention, the linear motion mechanism according to (4) further includes an iron powder concentration detection device which detects a concentration of iron powders included in the grease discharged from the discharge pipe.

Here, due to abrasion or damage of the ball screw or the nut, metal powder of iron or the like configuring the ball screw or the nut occurs. Accordingly, since concentration of the iron powder included in the discharged grease is detected by the iron powder concentration detection device, it is possible to detect occurrence of abrasion or damage of the ball screw or the nut. Accordingly, it is possible to perform maintenance of the linear motion mechanism at an appropriate timing, and it is possible to increase reliability of the linear motion mechanism.

(6) According to a sixth aspect of the present invention, there is provided a governing valve drive device of a governing valve which opens and closes a channel through which a working fluid flows by a valve element so as to adjust a flow rate of the working fluid, including: the valve element; and the linear motion mechanism according to any one of (1) to (5) which advances and retreats the valve element so as to open and close the channel by the valve element.

According to this configuration, it is possible to supply grease to the linear motion mechanism configuring the governing valve drive device from the outside of the casing.

(7) According to a seventh aspect of the present invention, there is provided a steam turbine, including: a turbine main body which includes a blade which is rotatably supported; a steam channel which is connected to the turbine main body and through which steam flows; a governing valve which linearly moves and opens and closes the steam channel; and the governing valve drive device according to (6) which drives the governing valve.

According to this configuration, it is possible to supply grease to the linear motion mechanism configuring the governing valve drive device of the steam turbine from the outside of the casing.

Advantageous Effects of Invention

According to the linear motion mechanism, the governing valve drive device, and the steam turbine according to the present invention, it is possible to supply grease to the linear motion mechanism from the outside of the casing. Accordingly, it is possible to easily supply grease regardless of the drive type of the ball screw. As a result, it is possible to easily and reliably perform maintenance of the ball screw, and it is possible to obtain high reliability.

BRIEF DESCRIPTION OF DRAWINGS

FIG. 4 is an enlarged main sectional view showing a configuration of a grease supply mechanism of a ball screw mechanism configuring the electric actuator in a first embodiment.

DESCRIPTION OF EMBODIMENTS

Hereinafter, a steam turbine according to an embodiment of the present invention will be described with reference to the drawings.

(First Embodiment)

Figure 1:
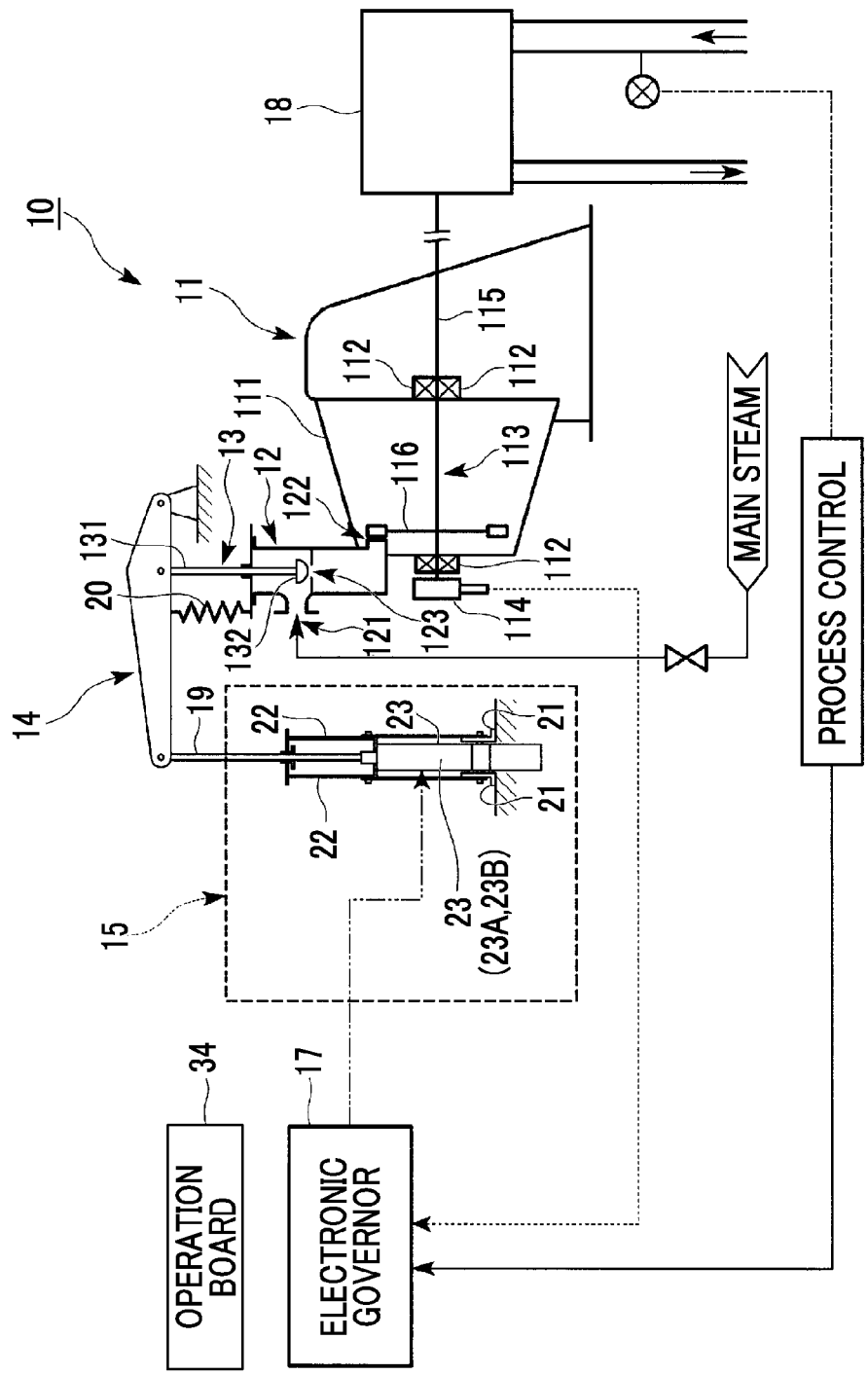
FIG. 1 is a schematic view showing the entire configuration of a steam turbine according to an embodiment of the present invention.

FIG. 1 is a schematic view showing the entire configuration of a steam turbine 10 according to an embodiment of the present invention.

As shown in FIG. 1, the steam turbine 10 of the present embodiment includes a turbine main body 11, a steam channel 12 through which steam serving as a working fluid flows, a governing valve 13, a lever member 14, a governing valve drive device 15, and an electronic governor 17 which controls the governing valve drive device 15.

The turbine main body 11 includes a tubular casing 111, a bearing 112 which is provided in the casing 111, a rotor 113 which is rotatably supported by the bearing 112 and is disposed inside the casing 111, and a speed detection sensor 114 which detects a rotating speed of the rotor 113. The rotor 113 includes a rotary shaft 115, and a plurality of blades 116 which are fixed to the rotary shaft 115.

The blades 116 configured as described above are rotated by steam, and a compressor 18 is driven by the rotating force.

The steam channel 12 is a channel which supplies steam serving as a working fluid to the turbine main body 11.

Steam is introduced from a steam inlet port 121 on one end side of the steam channel 12. A steam supply port 122 on the other end side of the steam channel 12 is connected to the turbine main body 11. Here, moreover, a throttle hole 123 in which the width of the channel is narrowed is provided between the steam inlet port 121 and the steam supply port 122. Moreover, in descriptions of the present embodiment, the case is described in which the "steam channel" according to the present invention is the channel through which the steam supplied to the turbine main body 11 flows. However, the present invention is not limited to this, and for example, the steam channel 12 may be a channel through which steam extracted from the turbine main body 11 flows.

The governing valve 13 adjusts an amount of the steam which is supplied to the turbine main body 11. The governing valve 13 includes a rod-shaped arm member 131, and an approximately hemispherical sealing member (valve element) 132 which is provided on the tip section of the arm member 131. A base end section of the arm member 131 is rotatably attached to an intermediate portion in a longitudinal direction of the lever member 14. Since the governing valve 13 has the above-described configuration, the arm member 131 linearly moves along the steam channel 12, and the sealing member 132 on the tip section of the arm member 131 is fitted to or separated from (in other words, opens and closes) the throttle hole 123 of the steam channel 12. Accordingly, a size of an opening between the throttle hole 123 and the sealing member 132 is changed. Therefore, a flow rate of the steam which is supplied to the turbine main body 11 via the throttle hole 123 is changed.

The lever member 14 is a member which transmits output of the governing valve drive device 15 to the governing valve 13 and causes the sealing member 132 to advance toward and to retreat from the steam channel 12. A base end section (right end section in FIG. 1) in the longitudinal direction of the lever member 14 is rotatably supported. One end section of a lever-side rod 19 is rotatably attached to the tip section in the longitudinal direction of the lever member 14. Moreover, as described above, a base end section of the arm member 131 configuring the governing valve 13 is rotatably attached to the intermediate portion in the longitudinal direction of the lever member 14. In addition, in the lever member 14, one end of a pull spring 20 is attached to the further tip side in the longitudinal direction of the lever member 14 relative to the attachment position of the arm member 131. The pull spring 20 functions as forcibly closing means for forcibly closing the governing valve 13. The other end of the pull spring 20 is fixed to a frame (not shown) of the steam channel 12 or the like so as to be immovable. That is, in a state where an external force is not applied to the pull spring 20, a tensile force which rotates the lever member 14 in the counterclockwise direction in FIG. 1 is applied to the lever member 14.

The governing valve drive device 15 is a mechanism which drives the above-described governing valve 13. The governing valve drive device 15 includes an electric actuator 23. The electric actuator 23 includes a pair of brackets 21 which is installed so as to be fixed to a pedestal or the like, and a holding member 22 which is rotatably supported by the brackets 21. The electric actuator 23 is held by the holding member 22.

Figure 2:
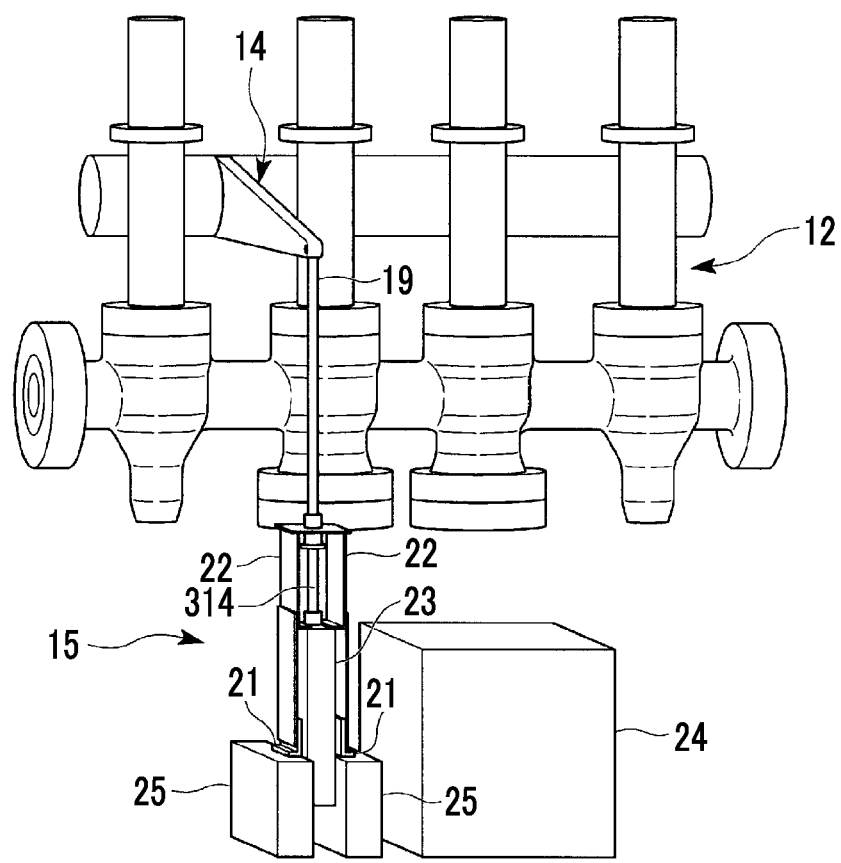
FIG. 2 is a perspective view showing the vicinity of a governing valve drive device of the steam turbine.

FIG. 2 is a perspective view showing the vicinity of the governing valve drive device 15.

Each of the pair of brackets 21 has an approximately L-shaped section. The pair of the brackets 21 is fixed to pedestals 25. The pedestals 25 are provided so as to be close to a bearing cover 24.

The bearing 112 which rotatably supports the rotary shaft 115 of the rotor 113 shown in FIG. 1 is accommodated in the bearing cover 24.

As shown in FIGS. 1 and 2, the holding member 22 has an approximately U shape in a side view. Both end sections of the approximately U shape of the holding member 22 are rotatably supported by the above-described pair of brackets 21.

Figure 3A:
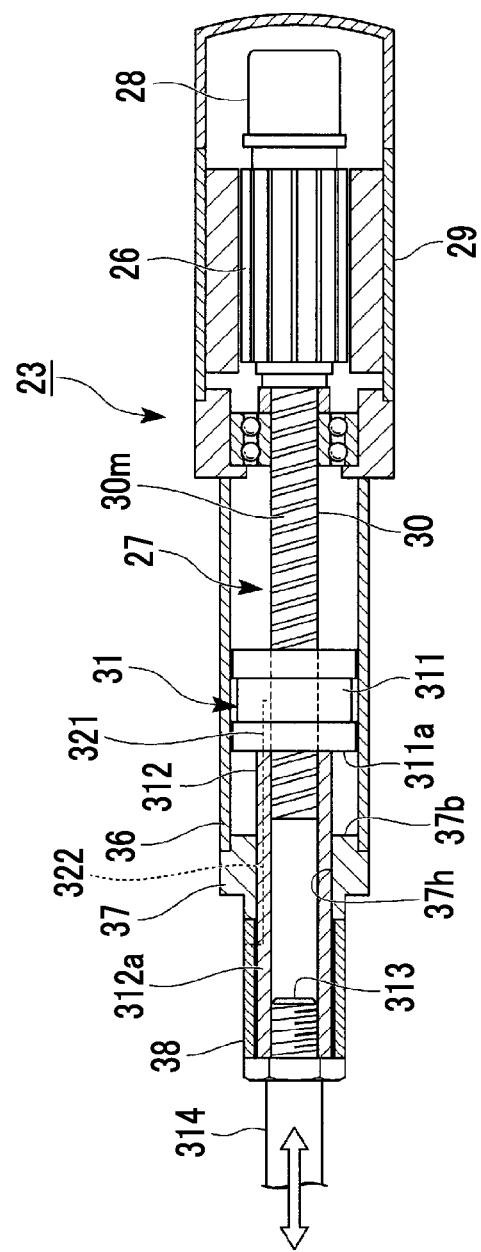
FIG. 3A is a sectional view showing an internal configuration of an electric actuator of the opening and closing drive mechanism, and shows a state before a nut moves along an axis.
Figure 3B:
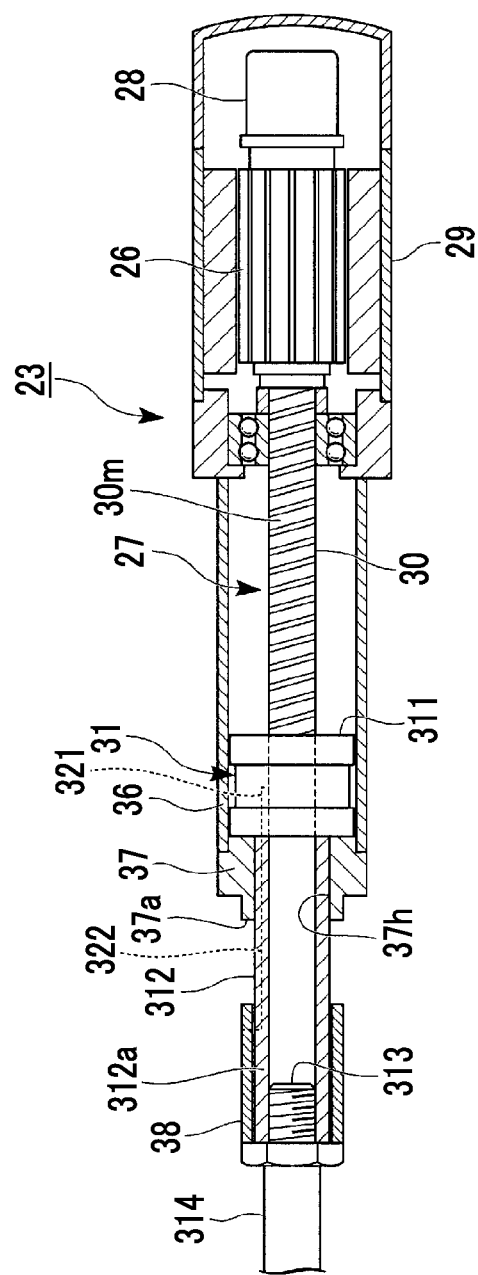
FIG. 3B is a sectional view showing the internal configuration of the electric actuator of the opening and closing drive mechanism, and shows a state after the nut moves along the axis.

FIGS. 3A and 3B are sectional views showing the internal configuration of the electric actuator 23. FIG. 4 is an enlarged main section view showing a configuration of a grease supply mechanism of a ball screw mechanism 27.

As shown in FIGS. 3A and 3B, the electric actuator includes the ball screw mechanism (linear motion mechanism) 27 and a brake 28.

The ball screw mechanism 27 is a mechanism which converts rotary motion of an electric motor 26 into linear motion of the lever-side rod 19. The ball screw mechanism 27 includes the electric motor 26, a ball screw 30 which is connected to a drive shaft of the electric motor 26 and is rotationally driven around an axis by the electric motor 26, and a piston unit 31 which advances and retreats relative to the ball screw 30 in the axial direction of the ball screw 30 according to the rotation of the ball screw 30.

Power is supplied to the electric motor 26, and the electric motor 26 rotates. The electric motor 26 is accommodated in a motor accommodation portion 29. The motor accommodation portion 29 is provided on the base end section of the electric actuator 23, and the inner portion thereof is closed. Accordingly, the electric motor 26 has an explosion-proof structure which is isolated from oil existing in the vicinity of the electric motor 26.

The ball screw 30 is a long screw member, and a female screw grooves 30m are formed on the outer circumference surface of the ball screw 30. One end section of the ball screw 30 is connected to the drive shaft of the electric motor 26.

The ball screw 30 is rotationally driven by the rotation of the electric motor 26.

The electric actuator 23 includes the brake 28 which is provided at a position on the side opposite to the ball screw 30 in a state where the electric motor 26 is interposed therebetween. The brake 28 is constituted of an electromagnetic disk brake. The brake 28 is operated when supply of power is cut off to stop the rotation of the electric motor 26.

The operation of the brake 28 is controlled by the electronic governor 17 (refer to FIG. 1). In a case where a circumferential speed of the ball screw 30 exceeds a threshold value, the electronic governor 17 operates the brake 28. That is, the rotation of the electric motor 26 is stopped by operating the brake 28.

The piston unit 31 reciprocates along the ball screw 30. The piston unit 31 includes a nut 311, a cylinder rod 312, a rod end connector 313, and an actuator-side rod 314.

The nut 311 is an approximately annular member which is screwed into the ball screw 30. As shown in FIG. 4, female screw grooves 311m are formed on the inner circumference surface of the nut 311.

A plurality of balls 316 are interposed between the female screw grooves 311m on the inner circumferential surface of the nut 311 and the female screw grooves 30m on the outer circumferential surface of the ball screw 30. Since the balls 316 roll between the female screw grooves 311m and the female screw grooves 30m, the nut 311 and the ball screw 30 are relatively displaced along a center axis C direction while the nut 311 and the ball screw 30 relatively rotate around the center axis C of the ball screw 30.

A circulation path 317 for circulating the balls 316 between one end side and the other end side of the nut 311 is formed inside the nut 311. Both end sections 317a and 317b of the circulation path 317 open to the inner circumferential surface of the nut 311 on one end side and the other end side of the nut 311.

The cylinder rod 312 is formed in a tubular shape so as to cover the outside of the ball screw 30 such that the ball screw 30 can insert into the inner portion of the cylinder rod 312. A flanged portion 312f which expands toward the outer circumferential side is formed on the base end section of the cylinder rod 312. The cylinder rod 312 is fixed to one end surface 311f of the nut 311 by bolts 315 at a plurality of locations in the circumferential direction of the flanged portion 312f.

As shown in FIGS. 3A and 3B, the rod end connector 313 is a member which is mounted on the tip section of the cylinder rod 312. A female screw is formed on the inner circumferential surface on the tip side of the rod end connector 313.

The actuator-side rod 314 is a member which extends in the extension direction of the cylinder rod 312. A male screw is formed on one end section in the longitudinal direction of the actuator-side rod 314. The male screw of the actuator-side rod 314 is screwed into the female screw of the rod end connector 313 and is fixed to the rod end connector 313.

The ball screw 30 and the nut 311 are surrounded by a piston casing (casing) 36. The outer circumferential surface of the nut 311 is fixed to the inner circumferential surface of the piston casing 36, and the rotation of the nut 311 around the center axis C is restricted.

The piston casing 36 includes a piston cap 37 which seals the piston casing 36 on the upper end (left ends in FIGS. 3A and 3B). A through hole 37h is formed in the piston cap 37, and the cylinder rod 312 protrudes and retracts through the through hole 37h. At this time, a tip section 312a of the cylinder rod 312 is always exposed to the outside from the piston casing 36 and the piston cap 37.

That is, since the piston unit 31 has the above-described configuration, if the ball screw 30 is rotationally driven around the axis by the electric motor 26, as shown in FIG. 3B, the nut 311 screwed into the ball screw 30 moves in the direction along the rotation direction of the ball screw 30 along the axis. According to the movement of the nut 311, the cylinder rod 312 which is fixed to the nut 311, the rod end connector 313, and the actuator-side rod 314 also moves in the axis of the ball screw 30 along with the nut 311.

Figure 5:
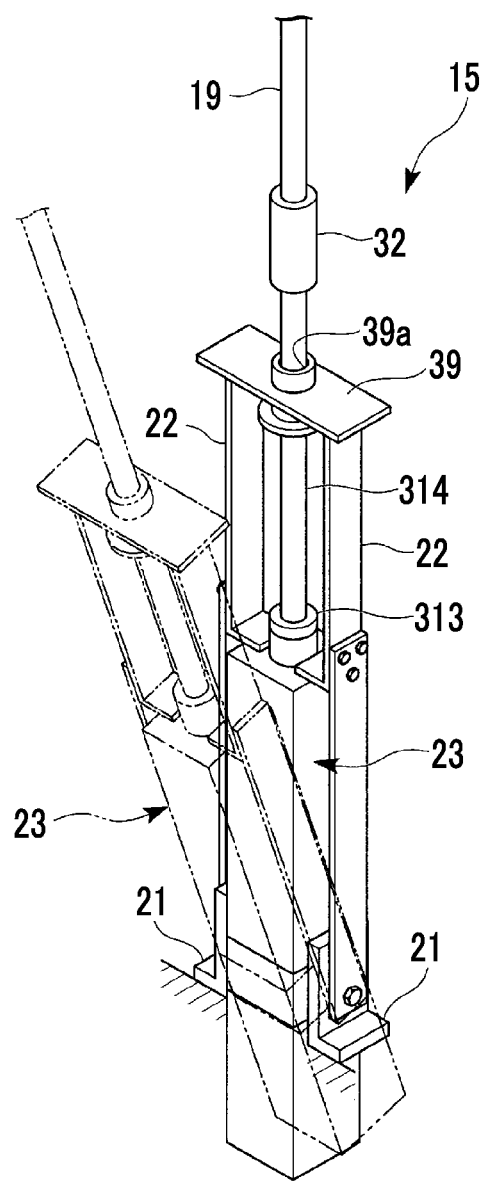
FIG. 5 is a perspective view showing the vicinity of the electric actuator.

FIG. 5 is a perspective view showing the vicinity of the electric actuator 23.

As shown in FIG. 5, the electric actuator 23 is fixed to the holding member 22.

The actuator-side rod 314 is inserted into a through hole 39a of a guide plate 39 which is provided on the upper end section of the holding member 22. The actuator-side rod 314 is connected to the lever-side rod 19.

As shown in two-dot chain lines in FIG. 5, in the electric actuator 23 which is installed as described above, the holding member 22 can rotate with a location supported by the bracket 21 as a supporting point according to the swing of the lever member 14.

The electronic governor 17 controls the operation of the governing valve drive device 15.

As shown in FIG. 1, results, in which a process control is performed based on a detection result of a pressure or a temperature in the compressor 18, are input to the electronic governor 17. In addition, the rotating speed of the blade 116 which is detected by the speed detection sensor 114 configuring the turbine main body 11 is input to the electronic governor 17. In addition, instruction from a user input from an operation board 34 is input to the electronic governor 17. The electronic governor 17 controls the operation of the governing valve drive device 15 based on each input. More specifically, the electronic governor 17 controls the operation of the electric motor 26 configuring the electric actuator 23 based on each input. Accordingly, the governing valve 13 is driven by the electric actuator 23.

As shown in FIG. 4, in the ball screw mechanism 27, as a grease supply mechanism, a nut-side grease supply hole 321 formed in the nut 311 and a cylinder rod-side grease supply hole 322 formed in the cylinder rod 312 are provided.

The nut-side grease supply hole 321 includes a discharge port 323 on one end, and the discharge port 323 opens toward the outer circumferential surface of the ball screw 30 on the inner circumferential surface of the nut 311. The nut-side grease supply hole 321 extends in the direction along the center axis C, and the other end 321b opens to the one end surface 311f of the nut 311.

The cylinder rod-side grease supply hole 322 includes an inlet 324 on one end, and the inlet 324 opens to the outer circumferential surface of the cylinder rod 312. The inlet 324 is formed at a position which is always exposed to the outside of the piston casing 36 in the cylinder rod 312.

The other end 322b of the cylinder rod-side grease supply hole 322 opens to the flanged portion 312f of the cylinder rod 312, and communicates with the nut-side grease supply hole 321. That is, the opening on the other end 322b of the cylinder rod-side grease supply hole 322 and the opening on the other end 321b of the nut-side grease supply hole 321 are connected so as to face each other. Accordingly, the cylinder rod-side grease supply hole 322 and the nut-side grease supply hole 321 communicate with each other.

Here, an annular seal member 325 is interposed between the flanged portion 312f and the one end surface 311f of the nut 311, and seals the vicinity of the connection portion between the cylinder rod-side grease supply hole 322 and the nut-side grease supply hole 321.

In this configuration, when grease is supplied to the ball screw 30 of the ball screw mechanism 27, grease is injected from the inlet 324 which is formed at the position of the cylinder rod 312 exposed to the outside of the piston casing 36 into the cylinder rod-side grease supply hole 322. Accordingly, the injected grease flows from the other end 322b of the cylinder rod-side grease supply hole 322 to the nut-side grease supply hole 321. In addition, the grease is supplied from the discharge port 323 of the nut-side grease supply hole 321 toward the outer circumferential surface of the ball screw 30.

Therefore, according to the linear motion mechanism, the governing valve drive device, and the steam turbine of the above-described first embodiment, the cylinder rod-side grease supply hole 322 communicating with the nut-side grease supply hole 321 is provided in the cylinder rod 312, and the inlet 324 through which the grease is injected to the cylinder rod-side grease supply hole 322 is formed at the position exposed to the outside of the piston casing 36. Accordingly, in the ball screw mechanism 27 in which the ball screw 30 and the nut 311 are accommodated in the piston casing 36, it is possible to supply grease from the outside of the piston casing 36. As a result, it is possible to easily and reliably perform maintenance of the ball screw 30, and it is possible to increase reliability of the ball screw mechanism 27, and the governing valve drive device 15 and the steam turbine 10 including the ball screw mechanism 27.

(Second Embodiment)

Next, a second embodiment of the ball screw mechanism 27, the governing valve drive device 15, and the steam turbine 10 according to the present invention will be described. In the second embodiment described below, only the configuration of the grease supply mechanism in the ball screw mechanism 27 is different from that of the first embodiment. Accordingly, the same reference numerals are assigned to the same portions as those of the first embodiment, and overlapping descriptions thereof are omitted.

Figure 6:
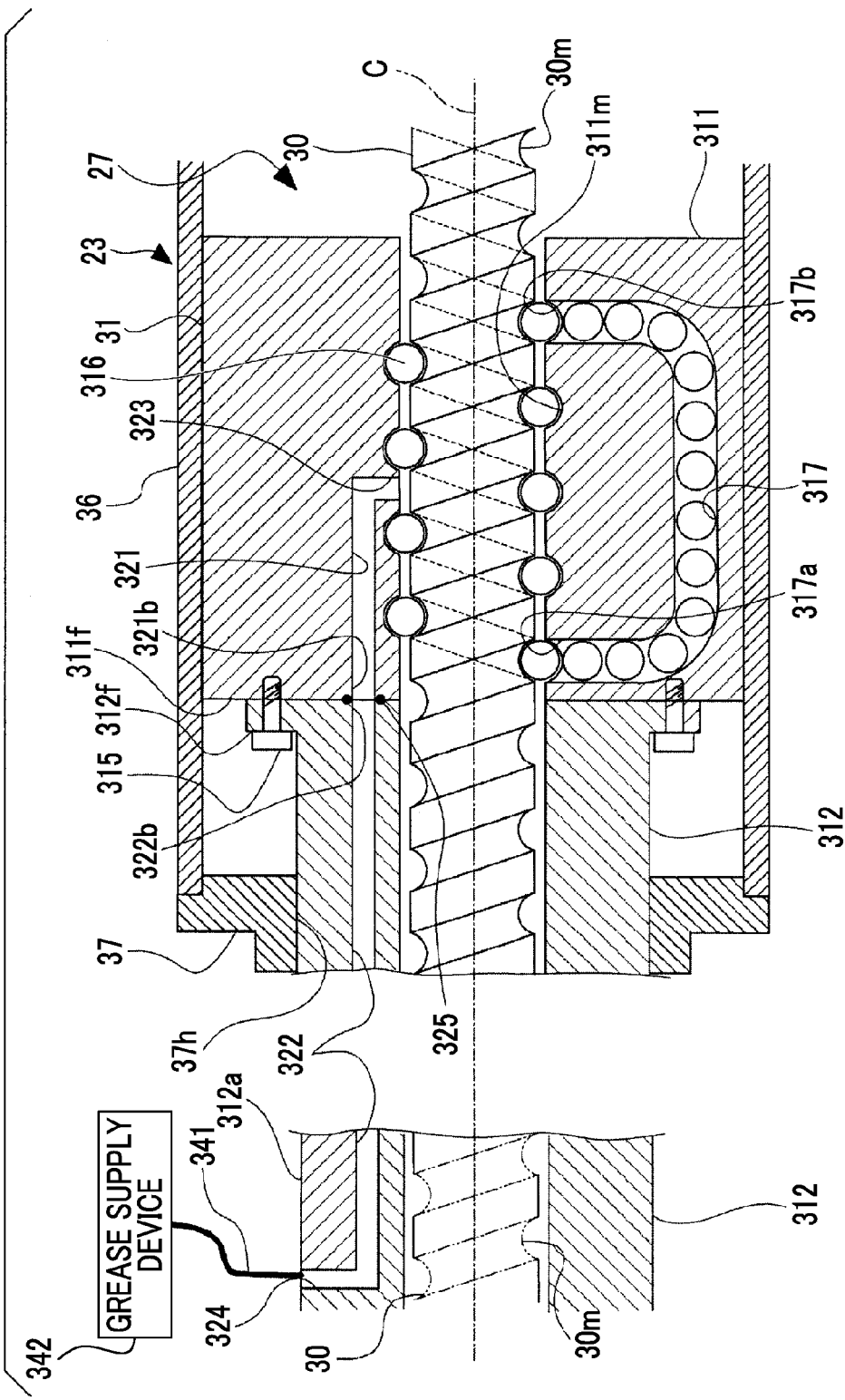
FIG. 6 is an enlarged main sectional view showing a configuration of a grease supply mechanism of the ball screw mechanism in a second embodiment.

FIG. 6 is an enlarged main sectional view showing the configuration of the grease supply mechanism of the ball screw mechanism 27 of the steam turbine 10 in the second embodiment.

As shown in FIG. 6, similarly to the first embodiment, in the ball screw mechanism 27, as the grease supply mechanism, the nut-side grease supply hole 321 which is formed in the nut 311 and the cylinder rod-side grease supply hole 322 which is formed in the cylinder rod 312 are provided.

In the ball screw mechanism 27, a grease supply pipe 341 having flexibility formed of a rubber-based material, a soft resin-based material, a flexible metal pipe, or the like is connected to the inlet 324 of the cylinder rod-side grease supply hole 322. A grease supply device 342 which supplies grease from the outside is connected to the grease supply pipe 341.

The grease supply device 342 can supply grease to the inlet 324 through the grease supply pipe 341 every predetermined operation time or the like.

According to this configuration, since grease is supplied from the outside by the grease supply device 342 and is injected from the inlet 324 of the cylinder rod-side grease supply hole 322 via the grease supply pipe 341, the grease supply of the ball screw mechanism 27 is automatically performed. Since the grease supply pipe 341 has flexibility, even though the nut 311 advances and retreats along the ball screw 30, the grease supply pipe 341 can be changed according to the advancement and retreat. Accordingly, in a state where the operation is continued, it is possible to supply grease.

Therefore, in the steam turbine 10 which is continuously operated for a long period and in which it is difficult to stop the operation so as to perform maintenance, it is possible to easily and reliably supply the grease to the ball screw mechanism 27 at an appropriate timing. As a result, it is possible to easily and reliably perform maintenance of the ball screw 30, and it is possible to increase reliability of the ball screw mechanism 27, and the governing valve drive device 15 and the steam turbine 10 including the ball screw mechanism 27.

(Third Embodiment)

Next, a third embodiment of the ball screw mechanism 27, the governing valve drive device 15, and the steam turbine 10 according to the present invention will be described. In the third embodiment described below, since only the configuration of the grease supply mechanism in the ball screw mechanism 27 is different from those of the first and second embodiments, the same reference numerals are assigned to the same portions, and overlapping descriptions thereof are omitted.

Figure 7:
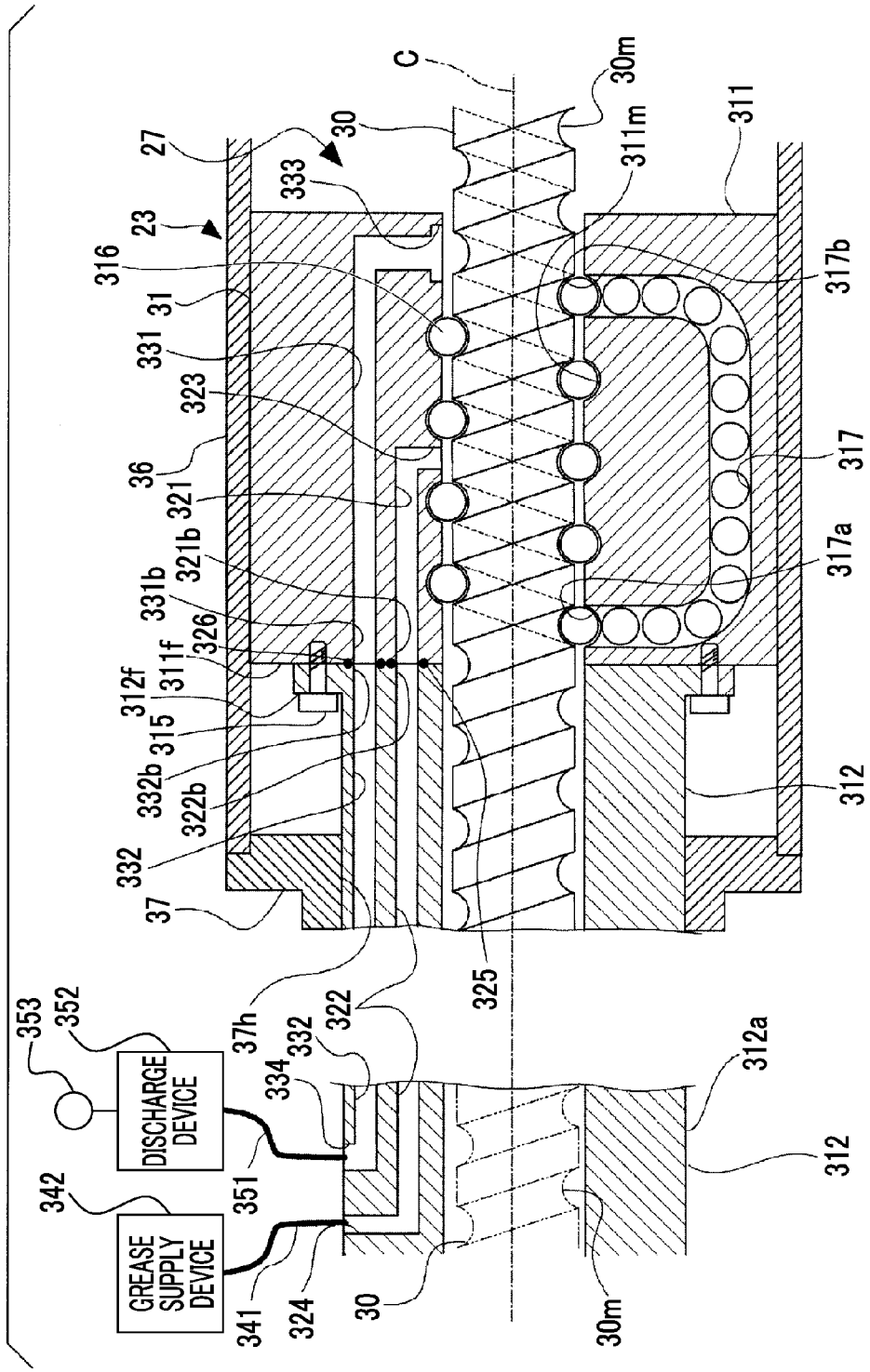
FIG. 7 is an enlarged main sectional view showing a configuration of a grease supply mechanism of the ball screw mechanism in a third embodiment.

FIG. 7 is an enlarged main sectional view showing the configuration of the grease supply mechanism of the ball screw mechanism 27 of the steam turbine 10 in the third embodiment.

As shown in FIG. 7, similarly to the second embodiment, as the grease supply mechanism of the ball screw mechanism 27, the nut-side grease supply hole 321 which is formed in the nut 311 and the cylinder rod-side grease supply hole 322 which is formed in the cylinder rod 312 are provided.

In addition, in the ball screw mechanism 27, the grease supply pipe 341 is connected to the inlet 324 of the cylinder rod-side grease supply hole 322. The grease supply device 342 which supplies grease from the outside is connected to the grease supply pipe 341.

Moreover, in the ball screw mechanism 27, a nut-side discharge hole 331 which is formed in the nut 311 and a cylinder rod-side discharge hole 332 which is formed in the cylinder rod 312 are formed.

The nut-side discharge hole 331 has an inflow port 333 on one end, and the inflow port 333 opens toward the outer circumferential surface of the ball screw 30 at a position different from the opening position of the discharge port 323 on the one end of the nut-side grease supply hole 321. In the nut 311, the inflow port 333 is formed further outside of the nut 311 relative to the end section 317b of the circulation path 317 for circulating the balls 316. If the balls 316 enter the circulation path 317 from the end section 317b, grease is extruded to the female screw grooves 30m of the ball screw 30 and is collected outside the end section 317b. Accordingly, the collected grease flows from the inflow port 333 into the nut-side grease supply hole 321 by the grease which is sequentially extruded.

The cylinder rod-side discharge hole 332 includes an outflow port 334 on one end, and the outflow port 334 opens at a position of the outer circumferential surface of the cylinder rod 312 exposed to the outside of the piston casing 36. The other end 332b of the cylinder rod-side discharge hole 332 communicates with the other end 331b of the nut-side discharge hole 331 at a facing portion at which the flanged portion 312f and the one end surface 311f of the nut 311 face each other. That is, the opening on the other end 332b of the cylinder rod-side discharge hole 332 and the opening on the other end 331b of the nut-side discharge hole 331 are connected so as to face each other. Accordingly, the cylinder rod-side discharge hole 332 and the nut-side discharge hole 331 communicate with each other.

An annular seal member 326 is interposed between the flanged portion 312f and the one end surface 311f of the nut 311, and seals the vicinity of the connection portion between the cylinder rod-side discharge hole 332 and the nut-side discharge hole 331.

In addition, a discharge pipe 351 having flexibility is connected to the outflow port 334 of the cylinder rod-side discharge hole 332. A discharge device 352 such as a pump which discharges the grease from the cylinder rod-side discharge hole 332 to the outside is connected to the discharge pipe 351.

An iron powder concentration detection device 353 which detects concentration of iron powder included in the grease discharged from the discharge pipe 351 is connected to the discharge device 352.

For example, in the iron powder concentration detection device 353, the grease discharged from the discharge pipe 351 is disposed inside a measurement coil (not shown), and the concentration of the iron powder included in the grease is detected by detecting variation in inductance of the measurement coil. Here, in a case where the concentration of the iron powder detected by the iron powder concentration detection device 353 exceeds a predetermined reference value, alarm information may be output by alarm sound, an alarm lamp, or the like using a controller or the like of the steam turbine 10.

Therefore, similarly to the second embodiment, according to the third embodiment, grease is supplied via the grease supply pipe 341 from the outside by the grease supply device 342, and the grease supply of the ball screw mechanism 27 is automatically performed.

In addition, it is possible to discharge the grease, which is discharged from the outflow port 334 of the cylinder rod-side discharge hole 332, to the outside through the discharge pipe 351. Moreover, since the grease discharged from the outflow port 334 is sucked by the discharge device 352, it is possible to more rapidly discharge the grease.

In addition, since the discharge pipe 351 has flexibility, even though the nut 311 advances and retreats along the ball screw 30, it is possible to discharge excessive grease due to supply of grease in a state where the operation is continued.

In addition, since the concentration of the iron powder included in the discharged grease is detected by the iron powder concentration detection device 353, it is possible to detect occurrence of abrasion or damage of the ball screw 30 or the nut 311. Accordingly, it is possible to perform maintenance of the ball screw mechanism 27 at an appropriate timing, and it is possible to increase reliability of the ball screw mechanism 27, and the governing valve drive device 15 and the steam turbine 10 including the ball screw mechanism 27.

In addition, the present invention is not limited to the above-described embodiments, and various modifications are applied to the above-described embodiments within a scope which does not depart from the gist of the present invention. That is, the specific shapes or configurations described in the embodiments are examples, and may be appropriately modified.

For example, in the embodiments, the nut 311 is fixed, and the ball screw 30 advances and retreats with respect to the nut 311. However, the present invention is not limited to this. Even in a drive type in which the nut 311 advances and retreats along the ball screw 30, it is possible to reliably supply grease by the configurations similar to the above-described those.

Moreover, the ball screw mechanism 27 is not limited to the governing valve drive device 15 or the steam turbine 10, and may be used for various purposes.

In addition, the configurations of the first to third embodiments are appropriately selected so as to be combined.

Moreover, the entire configuration or the like of the governing valve drive device 15 or the steam turbine 10 may be appropriately modified if it is within the scope of the gist of the present invention.

INDUSTRIAL APPLICABILITY

According to the linear motion mechanism, the governing valve drive device, and the steam turbine according to the present invention, it is possible to supply grease to the linear motion mechanism from the outside of the casing. Accordingly, it is possible to easily supply grease regardless of the drive type of the ball screw. As a result, it is possible to easily and reliably perform maintenance of the ball screw, and it is possible to obtain high reliability.

REFERENCE SIGNS LIST

10: steam turbine
11: turbine main body
12: steam channel
13: governing valve
14: lever member
15: governing valve drive device
23: electric actuator
26: electric motor
27: ball screw mechanism (linear motion mechanism)
30: ball screw
30m: female screw grooves
31: piston unit
36: piston casing (casing)
132: sealing member (valve element)
311: nut
311f: one end surface
312: cylinder rod
312a: tip section
316: ball
317: circulation path
321: nut-side grease supply hole
321b: other end
322: cylinder rod-side grease supply hole
322b: other end
323: discharge port
324: inlet
331: nut-side discharge hole
331b: other end
332: cylinder rod-side discharge hole
332b: other end
333: inflow port
334: outflow port
341: grease supply pipe
342: grease supply device
351: discharge pipe
352: discharge device
353: iron powder concentration detection device

The invention claimed is:

1. A linear motion mechanism, comprising:
an electric motor;
a ball screw which is rotationally driven around an axis by the electric motor;
a nut which is screwed into the ball screw, and advances and retreats relative to the ball screw in an axial direction of the ball screw according to rotation of the ball screw;

a casing which surrounds the ball screw and the nut;

a tubular cylinder rod which includes a base end section which is connected to the nut inside the casing and a tip section which is exposed to the outside of the casing, and into which the ball screw can be inserted;

a nut-side grease supply hole which is formed in the nut and includes a discharge port which opens toward an outer circumferential surface of the ball screw;

a cylinder rod-side grease supply hole which is formed in the cylinder rod, and includes an inlet which opens at a position exposed to the outside of the casing on one end of the cylinder rod-side grease supply hole, and the other end thereof which communicates with the nut-side grease supply hole;

a nut-side discharge hole which is formed in the nut and includes an inflow port, which opens toward the outer circumferential surface of the ball screw at a position different from the position of the opening of the one end of the nut-side grease supply hole, on one end of the nut-side discharge hole; and a cylinder rod-side discharge hole which is formed in the cylinder rod and includes an outflow port which opens at a position exposed to the outside of the casing on one end of the cylinder rod-side discharge hole and the other end which communicates with the nut-side discharge hole.

2. The linear motion mechanism according to claim 1, further comprising:

a discharge pipe through which the grease is discharged from the cylinder rod-side discharge hole to the outside and which is connected to the outflow port of the cylinder rod-side discharge hole and has flexibility.

3. The linear motion mechanism according to claim 2, further comprising:

an iron powder concentration detection device which detects a concentration of iron powders included in the grease discharged from the discharge pipe.

4. A governing valve drive device of a governing valve which opens and closes a channel through which a working fluid flows by a valve element so as to adjust a flow rate of the working fluid, comprising:

the valve element; and the linear motion mechanism according to claim 3 which advances and retreats the valve element so as to open and close the channel by the valve element.

5. A governing valve drive device of a governing valve which opens and closes a channel through which a working fluid flows by a valve element so as to adjust a flow rate of the working fluid, comprising:

the valve element; and the linear motion mechanism according to claim 2 which advances and retreats the valve element so as to open and close the channel by the valve element.

6. A governing valve drive device of a governing valve which opens and closes a channel through which a working fluid flows by a valve element so as to adjust a flow rate of the working fluid, comprising:

the valve element; and the linear motion mechanism according to claim 1 which advances and retreats the valve element so as to open and close the channel by the valve element.

7. A steam turbine, comprising:

a turbine main body which includes a blade which is rotatably supported;

a steam channel which is connected to the turbine main body and through which steam flows;

a governing valve which linearly moves and opens and closes the steam channel; and a governing valve drive device according to claim 6 which drives the governing valve.

\* \* \* \* \*